ZERO PHASE SHIFT ACTIVE ELEMENT FILTER

Filed May 28, 1964

INVENTOR.
DWIGHT W. BATTEAU
BY Kenway, Jenney & Hildreth
ATTORNEYS

United States Patent Office 3,322,970
Patented May 30, 1967

3,322,970
ZERO PHASE SHIFT ACTIVE ELEMENT FILTER
Dwight W. Batteau, Cambridge, Mass., assignor to United Research, Inc., Cambridge, Mass., a corporation of Massachusetts
Filed May 28, 1964, Ser. No. 370,827
6 Claims. (Cl. 307—88.5)

This invention relates to electronic filters, and more particularly to filters whose phase shift does not vary with the frequency of the input signal.

A large number of different types of electronic filters have been developed for various specialized purposes. Perhaps the largest number of these filters are parallel T or ladder type filters developed for use in the communications field. Particularly when several sections are used, these filters can be tailored to specific applications with very precise characteristics. Such filters are perfectly satisfactory when large numbers of filters of substantially identical characteristics are to be produced. However, a filter carefully tailored for one application is likely to be substantially useless in a slightly different application. Moreover, smaller organizations or groups usually do not have an individual skilled in the highly specialized techniques of complex filter design.

Accordingly, it is an object of the present invention to provide a reliable filter having relatively simple design criteria.

Another object is to provide a constant phase shift filter suitable for use in a wide variety of circuit embodiments.

A further object is to provide a constant phase shift filter whose optimum frequency ranges can be easily modified.

Still another object is to provide a filter possessing constant phase shift characteristics over an extended frequency range.

These and other objects are achieved in a filter system wherein the filter can be divided into two portions which have complex transmission characteristics differing only in the sign of the real portion. In a preferred embodiment the first section comprises a reactive and non-reactive arm, these arms being summed to provide a first section output. In its preferred form the reactive arm of the first filter section is identical with the second section.

The invention likewise involves the several features set forth in the following description and drawings wherein.

Figure 1:
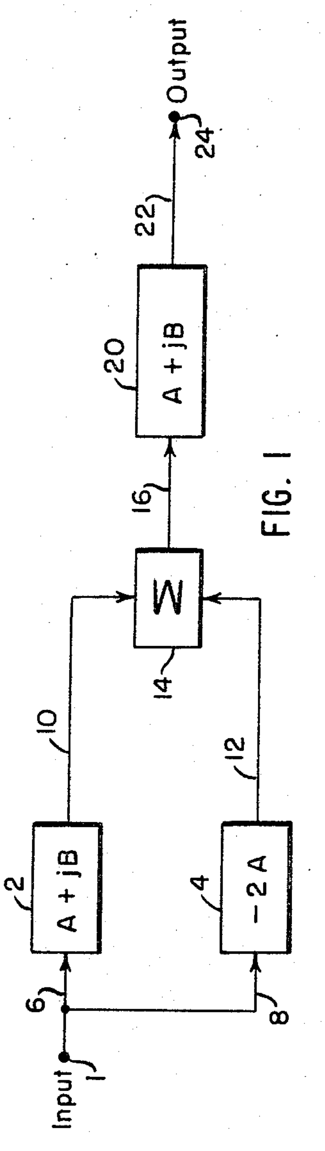
FIG. 1 is a system block diagram of the preferred embodiment of the filter.

The overall system operation may best be understood by reference to the block diagram of FIGURE 1. The input to the filter arrives at input terminal 1. This input is provided to first section filter arms 2 and 4 respectively through input lines 6 and 8 respectively. Filter arm 2 has a reactive as well as a resistive effect upon the incoming signal from line 6. The characteristics of arm 2 may be expressed in the form $A+jB$. The filter arm 4 has solely a resistive effect on the incoming signal and its characteristics may be expressed in the form $-2A$.

The outputs from arms 2 and 4 are transmitted over lines 10 and 12 respectively to summing device 14. The summed output appears on line 16. The action of the filter thus far may be expressed by the following equation in which the input signal is expressed as $e_i$, and the intermediate output signal from the summing device 14 is expressed as $e_o'$:

$$e_o'=e_i(A+jB)+e_i(-2A) \quad (1)$$

$$e_o'=e_i(A+jB-2A) \quad (2)$$

$$e_o'=e_i(-A+jB) \quad (3)$$

The output from summing device 14 is applied over line 16 as an input to the second filter section whose transmission characteristics may be expressed in the form $A+jB$. It will be recognized that this choice of characteristics permits the invention to use identical system components for the reactive arm of the first section and the entire second section. Utilizing the results of Equation 3 the output from the filter appearing on line 22 may be expressed in the following equation wherein the output signal is represented by the term $e_o$:

$$e_o=e_i(-A+jB)(A+jB) \quad (4)$$

$$e_o=e_i(-A^2-B^2) \quad (5)$$

$$e_o=-e_i(A^2+B^2) \quad (6)$$

Those skilled in the electronics art will recognize that while the term B has a magnitude which may vary with frequency, the expression $A^2+B^2$ is purely resistive in form and introduces no phase shift. As a result the signal appearing at output terminal 24 from line 22 has a phase relationship to the input signal inserted at the input terminal 1 which is independent of the frequency of the signal.

Figure 2:
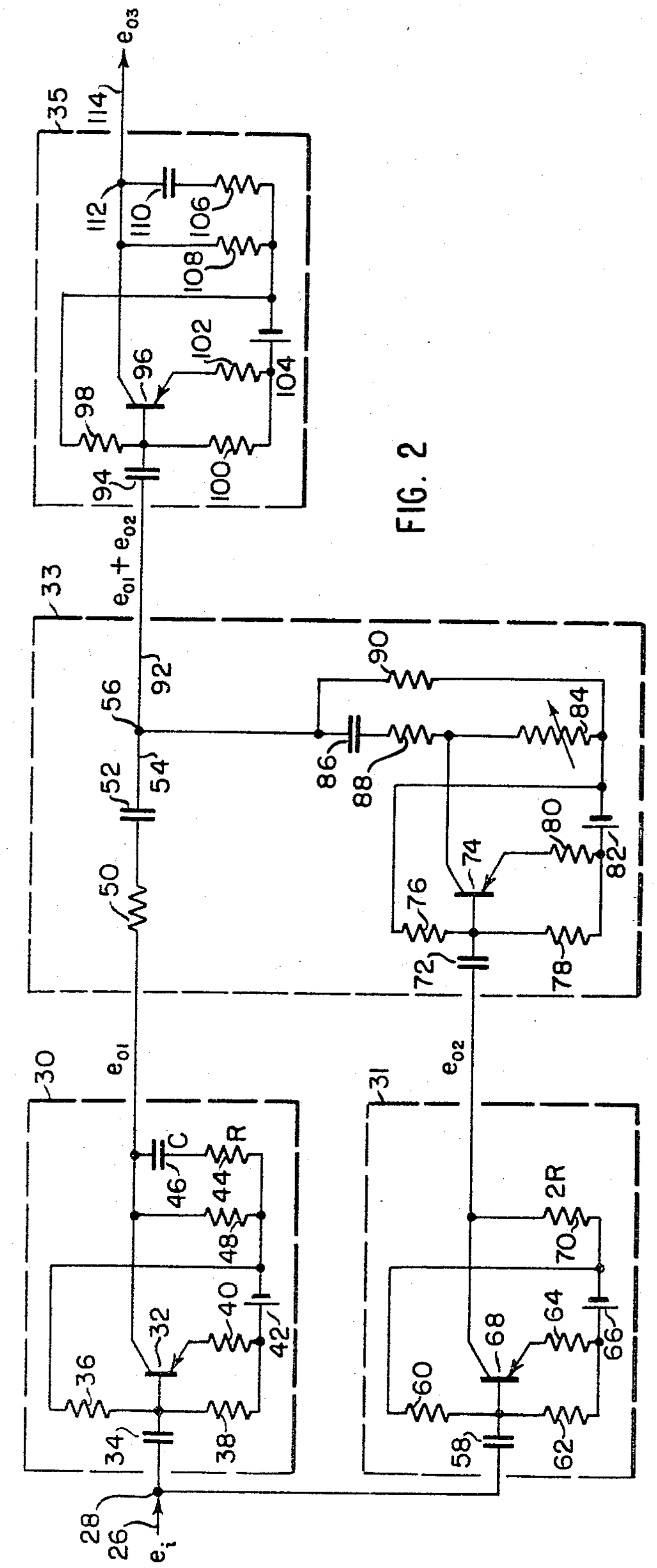
FIGURE 2 is a circuit schematic of a preferred embodiment.

While the system of FIGURE 1 has been presented in idealized block diagram form it has been found that the predicted results of filters according to the present invention can be achieved in the circuitry of FIGURE 2. The input signal $e_i$ arrives over line 26 at point 28. The transistor amplifier comprising the reactive arm is contained withn block 30. The input signal is fed to the base of transistor 32 by means of the coupling condenser 34. The coupling condenser serves the conventional function of providing DC isolation for the input signal path. The resistors 36, 38 and 40, as well as the battery or D.C. power supply 42 have values which are determined by the particular transistor 32 employed. These values are not specially dependent upon the present invention, but rather are determined according to conventional transistor amplifier design.

The resistor R and the condenser C identified by reference numerals 44 and 46 respectively are connected in series between the collector of transistor 32 and the negative terminal of battery 42, the polarities being appropriate for the PNP transistor shown. The resistor 48 is also connected between the collector of transistor 32 and the negative terminal of battery 42. The resistor 40 is connected in series between the emitter of transistor 32 and the positive terminal of battery 42. Typical values for the resistor R and condenser C are 100 ohms and 1.5 microfarads respectively. The value of resistor 48 may vary over a wide range so long as it is very much greater than the value of resistor R. The output from the amplifier 30, at the collector of transistor 32, passes through resistor 50, which may be 100,000 ohms, to coupling condenser 52. Thus the output of the reactive arm of the first filter section arrives at point 56 over line 54.

The resistive arm of the first section comprises the transistor amplifier contained within box 31. The input signal for this arm is provided from point 28 through coupling condenser 58. The arrangement of the coupling condenser 58 and the resistors 60, 62 and 64 with the battery 66 and the transistor 68 is identical to that for the transistor 32 of the arm 30.

Since the amplifier 31 comprises the resistive arm the circuit does not employ reactive elements. A resistor 2R identified by numeral 70 is connected between the collector of transistor 68 and the negative terminal of battery 66. Since the value of resistor 70 is twice that of resistor 44, 200 ohms is a suitable value for the present embodiment.

The output from the amplifier 31 is fed to the coupling condenser 72 of the summing inverter 33. The summing inverter 33 incorporates a transistor 74 utilized as a unity gain inverter. This transistor has resistors 76, 78 and 80 and battery 82 arranged in conventional fashion as was the case for the transistor amplifiers of arms 30 and 31. In its output circuit adjustable resistor 84 is adjusted to provide unity gain. Condenser 86 is connected in series with resistor 88 between point 56 and the collector of transistor 74. Resistor 90 is connected between point 56 and the negative terminal of battery 82. Suitable values for resistors 88 and 90 are 100,000 and 1,000 ohms respectively.

As noted earlier, the output from the reactive arm of the first filter section is transmitted to point 56 in the summing section, and the inverter incorporating transistor 74 provides an output from the resistive arm at point 56, so that outputs from the reactive and resistive arms are summed at point 56.

The output from the summing circuit 33 appears on line 92 from point 56 and is fed to the coupling condenser 94 of the second filter section 35. This filter section 35 incorporates a transistor 96 arranged in circuitry duplicating that of filter arm 30. Resistors 98, 100 and 102 and battery 104 are arranged exactly as the corresponding resistors 36, 38 and 40 and battery 42 for filter arm 30. The remainder of the circuitry is also identical to arm 30, that is, resistor 106 is 100 ohms, resistor 108 is very large compared to resistor 106 and condenser 110 is 1.5 microfarads. The over-all output from the filter appears on line 114 from point 112.

The operation of the filter of FIGURE 2 can be explained analytically as follows: the input signal to point 28 will be assumed to be $e_1$; the output current from the transistors 32 and 68 of filter arms 30 and 31 can be expressed as $i=Be_1$. Therefore the output voltage from filter arm 30 will be $i(R+1/j\omega c)$. The output voltage from filter arm 2 is $i(2R)$. Inverting the second arm output and summing the two give $i(-R+1/j\omega c)$.

The second filter section 35 is exactly like filter arm 30 so that the over-all filter response may be expressed by the following equations where $e_{o3}$ equals the output voltage and $i$ equals the collector current from the transistors of the first and second filter arms and the second filter section:

$$e_{o3}=i\left(-R+\frac{1}{j\omega c}\right)\left(R+\frac{1}{j\omega c}\right) \qquad (7)$$

$$e_{o3}=-i\left(R^2+\frac{1}{\omega^2C^2}\right) \qquad (8)$$

The collector current bears a relationship to the input voltage $e_1$ which is a function of the transistors employed. Therefore Equation 8 can be written as the following equation where $k$ is a constant determined by the transistor amplifier employed:

$$e_{o3}=e_1k\left(R^2+\frac{1}{\omega\, C^2}\right) \qquad (9)$$

Those skilled in the electronics arts will recognize that Equation 9 indicates no change in the phase of the output voltage with changes in frequency. The $\omega^2$ term does indicate that the magnitude of the output voltage will vary with frequency. The position $\omega^2$ in the denominator of a factor indicates that the output voltage will decrease with increases in frequency.

While the above discussion has been directed to filters in which the resistive components of the first and second filter sections are opposite in sign, the same constant phase output is obtained when the difference in sign is with respect to the reactive component. One way of explaining this fact is to note that this change in component sign difference can be obtained by multiplying one section by minus one, the effect of an inverter. Thus the over-all characteristics are identical, except for the sign of the output.

Filters of the type described above have been constructed and tested over extended frequency ranges. Typically, phase shifts of the output voltage with respect to the input voltage of less than plus or minus 6 degrees have been obtained over frequency ranges of more than two decades. These characteristics are obtained with readily available components and simple design criteria.

While the embodiment of FIGURE 2 employs transistor circuitry, it will be apparent to those skilled in the art that vacuum tubes or other amplifying devices could be used. Which amplifying device should be employed will depend on the economics and environment of the particular application. As long as the circuitry of the signal transmission system has the over-all characteristics discussed in connection with FIGURE 1, the filter will produce the minimum phase shift benefits of the present invention. Thus substantial variation in circuit details may be made without departing from the scope of the present invention.

Having thus described the invention, I claim:

1. A signal transmission system having input and output terminals and characterized by a minimum shift in the phase of the voltage at the output terminal with respect to the phase of the voltage at the input terminal with changes in frequency comprising a first filter section, said input terminal providing the input to said first section, a second filter section the output of the first filter section serving as the input to the second filter section, said first filter section having transmission characteristics which may be characterized by a resistive and a reactive component, said second filter section having transmission characteristics which may be characterized by a resistive and a reactive component, the reactive components of said first and second filter section characteristics being equal in magnitude and comprising a reactive group, and the resistive components of said first and second filter section transmission characteristics being equal in magnitude and comprising a resistive group, and the components of one of said groups being opposite in sign, the output of said second filter section serving as the output to the output terminals.

2. A signal transmission system having input and output terminals and characterized by a minimum shift of the phase of the voltage at the output terminal with respect to the phase of the voltage at the input terminal with changes in frequency comprising a first filter section, the input terminal providing the input to the first filter section, said first filter section having first and second arms, the first arm having resistive and reactive transmission characteristics, the second arm having solely resistive transmission characteristics, a summing section, the output from said first and second arms being provided as the input to said summing section, said summing section providing an output having resistive and reactive transmission characteristics, a second filter section, said second filter section having resistive and reactive transmission characteristics, the reactive transmission characteristics of said second filter section being equal in magnitude to the reactive characteristics through said summing section, said reactive characteristics comprising a reactive group, the resistive transmission characteristics from said summing section being equal in magnitude to the resistive transmission characteristics of said second filter section, said resistive characteristics comprising a resistive group, the components of one of said groups being opposite in sign, the output from said summing section being provided as the input to said second filter section, and the output from said second filter section providing the output for the output terminal of the signal transmission system.

3. A signal transmission system having input and output terminals and characterized by a minimum shift in the phase of the voltage at the output terminals with respect to the phase of the voltage at the input terminal with changes in frequency comprising a first filter section, said first filter section having first and second arms, said input terminal providing an input to each of said arms, the first of said arms having resistive and reactive transmission characteristics, the second of said arms providing an output characterized by resistive transmission characteristics, the resistive transmission characteristics of said second arm being twice the magnitude and opposite in sign with respect to the resistive transmission characteristics of said first arm, means for summing the outputs from said first and second arms, said summed output providing filter transmission characteristics having resistive and reactive transmission characteristics, a second filter section, said second filter section having resistive and reactive transmission characteristics, the reactive transmission characteristics of said second section being equal to the reactive transmission characteristics from the input through said summing means, said reactive characteristics comprising a reactive group, the resistive transmission characteristics of second filter section being equal in magnitude to the resistive transmission characteristics provided from the summing means, said resistive characteristics providing a resistive group, the components of one of said groups being opposite in sign, the output from the summing means being applied as an input to the second filter section, and the output from said second filter section providing the output for the output terminal of the signal transmission system.

4. A signal transmission system having an input and an output terminal and characterized by a minimum shift in the phase of the voltage at the output terminal with respect to the voltage at the input terminal with changes in frequency comprising a first filter section having first and second arms, the input terminal providing the input voltage to both of said arms, the output from said first arm having both resistive and reactive transmission characteristics, the output from said second arm having resistive transmission characteristics, the resistive transmission characteristics of said second arm being twice the resistive transmission characteristics of said first arm, means to invert the output from said second arm to provide an output equal in magnitude but opposite in sign, means to sum the outputs from said first arm and said inverting means for the second arm, the summing means providing an output having resistive and reactive transmission characteristics, a second filter section having resistive and reactive transmission characteristics, both the resistive and reactive transmission characteristics of the second filter section corresponding to those of the first arm of the first filter section in magnitude and sign, and means to provide the output from the summing means as an input to said second filter section, the output from said second filter section serving as the output for the output terminal of said signal transmission system.

5. A signal transmission system having an input and an output terminal and characterized by a minimum shift in the phase of the voltage at the output terminal with respect to the voltage at the input terminal with changes in frequency comprising a first filter section having first and second filter arms, said first filter arm having an active circuit element and resistive and reactive passive circuit elements, said first arm providing an output having resistive and reactive transmission characteristics, said second filter arm having a second active element, the output circuit of said second active element having a resistive element and substantially no reactive elements, the second filter arm providing transmission characteristics of twice the magnitude of the resistive transmission characteristics of the first filter arm, means to invert the output from the second filter arm to provide an output equal in magnitude but opposite in sign, means to sum the output from said first filter arm and said inverted output from said second filter arm, a second filter section having a third active element, said third active element having resistive and reactive passive circuit elements in its output circuit, means to apply the summed first section output voltages as the input to said second filter section, the output from said second filter section serving as the output to the output terminal of the signal transmission system.

6. A signal transmission system having an input and an output terminal and characterized by a minimum shift in the phase of the voltage at the output terminal with respect to the voltage at the input terminal with changes in frequency comprising a first filter section having first and second arms, means to apply the voltage at the input terminal to each of said arms, said first arm having a first active circuit element, the output circuit associated with said first active circuit element comprising a first resistive element and a first reactive element, the second filter arm having a second active circuit element, the output circuit of said second active element having a second resistive element, said second resistive element, said second resistive element being twice the magnitude of said first resistive element, said first arm providing an output voltage having resistive and reactive transmission characteristics, said second arm providing an output voltage having transmission characteristics equal to twice the resistive transmission characteristics of said first arm, means to invert the output from said second filter arm, means to sum the inverted output from said second filter arm and the output from said first filter arm, a second filter section, said second filter section having a third active element, said third active element containing a third resistive element and a second reactive element in its output circuit, said third resistive element being equal in magnitude to said first resistive element, said second reactive element being equal in magnitude to said first reactive element, and means to apply the summed output from the first section as the input to said second filter section, the output from said second filter section providing the output for the output terminal of the signal transmission system.

References Cited

UNITED STATES PATENTS

| | | | |
|---|---|---|---|
| 2,210,028 | 8/1940 | Doherty | 330—124 X |
| 2,376,392 | 5/1945 | Shepherd | 330—124 X |
| 2,382,097 | 8/1945 | Purington. | |
| 2,548,855 | 4/1951 | Bartelink | 330—124 X |
| 2,606,966 | 8/1952 | Pawley. | |
| 2,950,440 | 8/1960 | Cooper | 330—124 X |

ARTHUR GAUSS, *Primary Examiner.*

J. JORDAN, *Assistant Examiner.*